US012113413B2

(12) United States Patent
Leonardi et al.

(10) Patent No.: US 12,113,413 B2
(45) Date of Patent: Oct. 8, 2024

(54) ELECTRIFIED VEHICLE HAVING ELECTRIC MACHINE STATOR WITH EMBEDDED WIRE SUPPORT OVERMOLD

(71) Applicant: FORD GLOBAL TECHNOLOGIES, LLC, Dearborn, MI (US)

(72) Inventors: Franco Leonardi, Dearborn Heights, MI (US); Michael W. Degner, Novi, MI (US); Man Prakash Gupta, Dearborn, MI (US); Christopher White, Shenfield (GB); Steven White, Maldon (GB); Gary Thomas Martini, Dexter, MI (US); Singar Rathnam, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 17/515,517

(22) Filed: Oct. 31, 2021

(65) Prior Publication Data

US 2023/0134509 A1    May 4, 2023

(51) Int. Cl.
*H02K 3/12*   (2006.01)
*H02K 3/30*   (2006.01)
*H02K 15/00*  (2006.01)
*H02K 15/02*  (2006.01)
*B60K 1/00*   (2006.01)

(52) U.S. Cl.
CPC ............... *H02K 3/12* (2013.01); *H02K 3/30* (2013.01); *H02K 15/0056* (2013.01); *H02K 15/024* (2013.01); *B60K 1/00* (2013.01)

(58) Field of Classification Search
CPC ............ H02K 3/32; H02K 3/34; H02K 3/345; H02K 3/38; H02K 5/15; H02K 2203/12
See application file for complete search history.

(56) References Cited

U.S. PATENT DOCUMENTS 6,400,056 B1 *  6/2002  Naka ................. H02K 3/345
                                               310/59
6,674,211 B2 *  1/2004  Katou ................ H02K 15/10
                                               29/598

(Continued)

FOREIGN PATENT DOCUMENTS

JP        5383208 B2    1/2014

OTHER PUBLICATIONS

Spaceflight Power Supply Co. Ltd. What is traction battery, Dec. 17, 2020 (Year: 2020).*

*Primary Examiner* — Daniel C Puentes
*Assistant Examiner* — Minki Chang
(74) *Attorney, Agent, or Firm* — Brooks Kushman PC; David B. Kelley

(57) ABSTRACT

A vehicle, electric machine, and method of manufacturing an electric machine include a stator having teeth extending from a yoke portion toward a rotor and defining slots between adjacent teeth with windings positioned within the slots, wherein the slots are coated with an electrically insulating material having an arcuate surface exiting the slots and extending at least partially over the teeth on at least one end face of the stator to form a winding guide for bending/positioning the windings. The winding guide may be formed by a molded epoxy that replaces insulating paper slot liners while providing a template for forming the hairpin bends of end windings.

16 Claims, 3 Drawing Sheets

(56) References Cited

U.S. PATENT DOCUMENTS

| | | |
|---|---|---|
| 6,791,228 B2 | 9/2004 | Hashiba et al. |
| 7,417,342 B2 | 8/2008 | Engesser et al. |
| 9,331,553 B2 | 5/2016 | Mayor et al. |
| 10,008,907 B2 | 6/2018 | Hanumalagutti et al. |
| 10,069,379 B2 | 9/2018 | Hanumalagutti et al. |
| 10,097,066 B2 | 10/2018 | Hanumalagutti et al. |
| 10,536,055 B2 | 1/2020 | Hanumalagutti et al. |
| 2004/0256943 A1* | 12/2004 | Omura ............... H02K 3/345 310/215 |
| 2017/0005537 A1* | 1/2017 | Matahira ............. H02K 1/16 |
| 2017/0267055 A1 | 9/2017 | Hanumalagutti et al. |
| 2017/0310189 A1 | 10/2017 | Hanumalagutti et al. |
| 2022/0385152 A1* | 12/2022 | Engelhardt ............ H02K 15/10 |

* cited by examiner

ELECTRIFIED VEHICLE HAVING ELECTRIC MACHINE STATOR WITH EMBEDDED WIRE SUPPORT OVERMOLD

TECHNICAL FIELD

This disclosure relates to an electrified vehicle and electric machine having a stator with an embedded wire support overmold.

BACKGROUND

Electrified vehicles rely on a high voltage traction battery to provide power to an electric machine operable as a traction motor for propulsion. Electric machines include a stator that surrounds a rotor that rotates to generate electricity when operating as a generator or to produce torque when operating as a motor. The stator may be formed from stacked laminations having teeth that extend from a back iron or yoke to form an inner circumference with an air gap between the teeth and the rotor. The teeth define slots that may be lined with insulation paper prior to bending/twisting of the electrically conductive wires or windings to form multiple phases around sections of the circumference. During manufacturing, wires are inserted from the crown side of the stator and emerge on the weld-side (also referred to as the twist side) where they are bent into a hairpin using metal tools, commonly called "fingers". These fingers provide protection for the delicate insulation paper in addition to imparting the curvature on the end windings. After the stator is wound, the windings are further insulated with a resin, epoxy, varnish, lacquer or similar material to protect the windings from contamination and electrical shorting, and also to make the windings more mechanically rigid.

SUMMARY

Embodiments of the disclosure include a vehicle comprising a traction battery and an electric machine powered by the traction battery and configured to provide propulsive power to the vehicle. The electric machine includes a rotor separated by an air gap from a stator surrounding the rotor. The stator includes teeth extending from a yoke portion toward the rotor and defining slots between adjacent teeth, the slots coated with an electrically insulating material having an arcuate surface exiting the slots and extending at least partially over the teeth on at least one end face of the stator. The stator further includes windings positioned within and extending from the slots in contact with the arcuate surface of the insulating material. Each slot may include a plurality of windings with the electrically insulating material comprising protuberances extending between the plurality of windings over the teeth on the end face of the stator. Each protuberance may extend from a first associated arcuate surface and ramp to a second associated arcuate surface exiting an adjacent slot. The electrically insulating material may comprise an epoxy, which is hardened or cured before the windings are positioned within the slots. The windings may comprise electrically conductive windings having a rectangular cross section. The slots may comprise closed slots.

In various embodiments, an electric machine includes a rotor and a stator surrounding the rotor and separated by an air gap. The stator comprises teeth extending from a yoke portion toward the rotor and defining slots between adjacent teeth. The stator includes a molded electrically insulating material coating the slots and having a curved surface extending from the slots and at least partially covering the teeth on at least one end face. The molded material is configured to guide associated windings extending from the slots. Each slot may have a plurality of associated windings. The electrically insulating material may extend between at least a portion of the windings for each slot. The electrically insulating material may form a ramped surface extending from a lower first curved surface associated with a first slot to a higher second curved surface associated with a second slot, the second slot being adjacent to the first slot. The electrically insulating material may form a second ramped surface extending from a higher third curved surface associated with the first slot to a lower fourth curved surface associated with the second slot. The molded electrically insulating material may comprise an epoxy that is cured or hardened before the windings are positioned within the slots. The windings may comprise electrical conductors each having a rectangular cross-sectional area.

Embodiments may also include a method of manufacturing an electric machine comprising forming a stator core from a plurality of laminations each having teeth extending from a yoke portion toward an inner circumference, adjacent teeth forming a slot therebetween, and molding a winding guide on the stator core using a fluid that hardens to form electrically insulating arcuate surfaces extending from the slots to the teeth of at least one end face of the stator core, and positioning windings within and extending from the slots, and bending the windings against the arcuate surfaces to form end windings. The method may include positioning a plurality of windings in each of the slots. The method may include molding a plurality of protuberances on the at least one end face, each of the protuberances having a ramped surface extending from an arcuate surface extending from a first one of the slots to an arcuate surface extending from a second one of the slots adjacent to the first one of the slots. The method may include molding a plurality of ramped protuberances for each of the slots, each slot having an associated first protuberance ramping from a lower arcuate surface associated with a first slot to a higher arcuate surface associated with a second slot adjacent to the first slot, and a second protuberance ramping from a higher arcuate surface associated with the first slot to a lower arcuate surface associated with the second slot. The method may include positioning a plurality of windings in each of the slots, wherein the plurality of windings corresponds in number to the plurality of ramped protuberances. The method may include molding the winding guide using an epoxy.

Various embodiments of the disclosure may provide one or more associated advantages. For example, an electric machine having a stator with an embedded wire support overmold eliminates the use of metal fingers or similar tools during manufacturing. The stator paper slot liners are replaced with a layer of epoxy with bending of conductor bars/wires directly against the epoxy. The bend radius is formed by the epoxy which provides the support and curvature needed for the bending operation. Replacing paper slot liners and metal finger tools, which require additional clearance to protect the slot liners, with epoxy reduces the winding profile resulting in a lower overall length of the end turns of the conductors. The embedded conductor support may be realized with stators having sealed or open slot designs.

DETAILED DESCRIPTION

Figure 1:
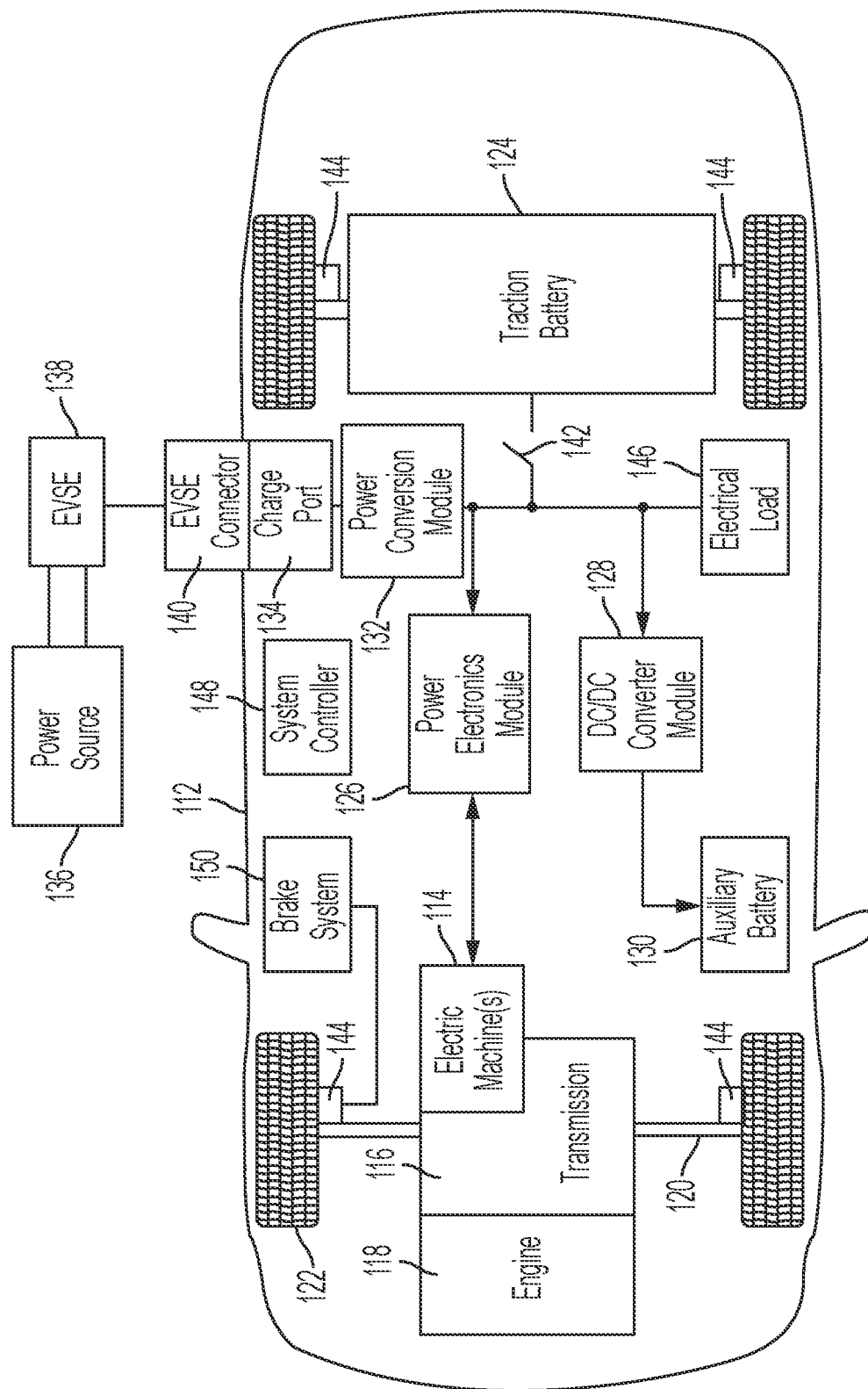
FIG. 1 is a diagram illustrating an electrified vehicle having an electric machine with stator laminations having an overmold winding guide feature.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electrified vehicles include one or more electric machines that may operate as a generator to power devices or store energy in a traction battery, or as a motor to provide torque to propel the vehicle. Electric machines include a rotor that rotates during operation within a stationary stator. The stator may be comprised of a plurality of stacked laminations. The laminations may be made of electric steel or other iron alloys. The laminations may have teeth extending from a back iron or yoke portion toward a center opening that accommodates the rotor. The teeth define or form slots between adjacent teeth. An insulating material, such as an epoxy or resin material, may be formed within the slots and extend to one or both faces of the laminations to form bending and/or positioning guides for conductive windings wound throughout the slots to carry electric current as described herein.

Windings may be used to conduct electric current through the slots in the stator iron core, which induces the magnetic field. The windings may be one solid conductor for a single-phase motor, or one solid conductor for each phase of a multiple phase motor. The individual conductors may have various cross-section geometries, such as round or rectangular (or square). Rectangular or square conductors may include rounded or filleted corners. The windings or individual conductors may have a coating (e.g., varnish, epoxy, resin, paint, enamel) to prevent cross-conduction between individual conductors. The windings may have the same cross-sectional areas to maintain uniform copper losses.

For multi-phase electric machines, the windings of different phases may be separated by an insulator to prevent short circuits between the windings because the electric potential between different phases may overcome insulation provided by ambient air and the varnish between the windings. Various embodiments according to the present disclosure replace insulation paper lining the slots with a molded epoxy or similar material, which also forms the conductor bending/positioning guides on the face of the stator. An additional electrically insulating coating such as a lacquer, resin, or epoxy (that may be thermally conductive) may be applied to the windings and epoxy overmold after the windings are installed in the stator slots to improve the heat transfer characteristics, prevent electrical short circuiting, and provide mechanical rigidity of the assembly.

Various techniques may be used to apply the electrically insulating coating compound or material, including a dip and cure/bake, a trickle application, vacuum pressure impregnation, and resin sealing. Dip and bake application includes immersing the motor windings into a tank of insulating liquid (often twice to ensure full coverage) followed by heating in an oven to cure/harden the compound. In a trickle application, the winding is connected to a rotating table and electrical resistance is used to generate heat while rotating and a trickle stream of material is introduced to the winding head. The compound follows the wire into the entirety of the slot to reduce or eliminate the possibility of partial discharge in random windings. Once fully saturated, the current is increased in the windings to cure the compound while rotating. Vacuum Pressure Impregnation (VPI) utilizes a vacuum pressure tank filled with insulating compound or material to fully impregnate motor windings and insulation with resin or varnish. The windings may be preheated to improve performance with capacitance measured over multiple cycles to determine acceptable fill. Another alternative involves resin sealing or potting to insulate the windings by completely impregnating the coils and insulation with a high molecular weight thermoset polymer resin.

FIG. 1 depicts a representative electrified vehicle, which is a plug-in hybrid electric vehicle (HEV) in this example. Vehicle 112 may comprise one or more electric machines 114 mechanically connected to a transmission 116 having a stator with a molded winding guide as described herein. The electric machines 114 may be capable of operating as a motor or a generator. In addition, the transmission 116 is mechanically connected to an internal combustion engine 118. The transmission 116 is also mechanically connected to a drive shaft 20 that is mechanically connected to the wheels 122. The electric machines 114 can provide propulsion and regenerative braking capability when the engine 118 is turned on or off. During regenerative braking, the electric machines 114 act as generators and can provide fuel economy benefits by recovering energy that would normally be lost as heat in the friction braking system. The electric machines 114 may also reduce vehicle emissions by allowing the engine 118 to operate at more efficient speeds and allowing the hybrid-electric vehicle to be operated in electric mode with the engine 118 off under certain conditions.

A traction battery or battery pack 124 stores energy that can be used by the electric machines 114. A vehicle battery pack 124 typically provides a high voltage DC output. The traction battery 124 is electrically connected to one or more power electronics modules. One or more contactors may isolate the traction battery 124 from other components when opened and connect the traction battery 124 to other components when closed. A power electronics module 126 is also electrically connected to the electric machines 114 and provides the ability to bi-directionally transfer energy between the traction battery 124 and the electric machines 114. For example, a typical traction battery may provide a DC voltage while the electric machines 114 may require a three-phase AC current to function. The power electronics module 126 may convert the DC voltage to a three-phase AC current as required by the electric machines 114. In a regenerative mode, the power electronics module may convert the three-phase AC current from the electric machines 114 acting as generators to the DC voltage required by the traction battery 124. The description herein is equally applicable to an electrified vehicle implemented as a pure electric vehicle, often referred to as a battery electric vehicle (BEV). For a BEV, the hybrid transmission 116 may be a gear box connected to an electric machine and the engine 118 may be omitted.

In addition to providing energy for propulsion, the traction battery 124 may provide energy for other vehicle electrical systems. A typical system may include a DC/DC converter module that converts the high voltage DC output of the traction battery 124 to a low voltage DC supply that is compatible with other vehicle loads. Other high-voltage loads, such as compressors and electric heaters, may be connected directly to the high-voltage without the use of a DC/DC converter module 128. The low-voltage systems may be electrically connected to an auxiliary battery 130 (e.g., 12V, 24V, or 48V battery).

The electrified vehicle 112 may be a BEV or a plug-in hybrid vehicle in which the traction battery 124 may be recharged by an external power source 136, or a standard hybrid that charges traction battery from operating electric machines as a generator but does not receive power from an external power source. The external power source 136 may be a connection to an electrical outlet. The external power source 136 may be electrically connected to electric vehicle supply equipment (EVSE) 138. The EVSE 138 may provide circuitry and controls to manage the transfer of energy between the power source 136 and the vehicle 112. In other embodiments, the vehicle 112 may employ wireless charging, which may be referred to as hands-free or contactless charging that uses inductive or similar wireless power transfer.

The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling as previously described.

One or more wheel brakes 144 may be provided for friction braking of the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that are required to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 to achieve desired operation. The brake system 150 may respond to driver commands and may also operate autonomously to implement features such as stability control. The controller of the brake system 150 may implement a method of applying a requested brake force when requested by another controller or sub-function.

One or more electrical loads 146 may be connected to the high-voltage bus. The electrical loads 146 may have an associated controller that operates the electrical load 146 when appropriate. Examples of electrical loads 146 may be a heating module or an air-conditioning module.

The various components described may have one or more associated controllers to control and monitor the operation of the components. The controllers may communicate via a serial bus (e.g., Controller Area Network (CAN)) or via discrete conductors. In addition, a system controller may be present to coordinate the operation of the various components.

Figure 2:
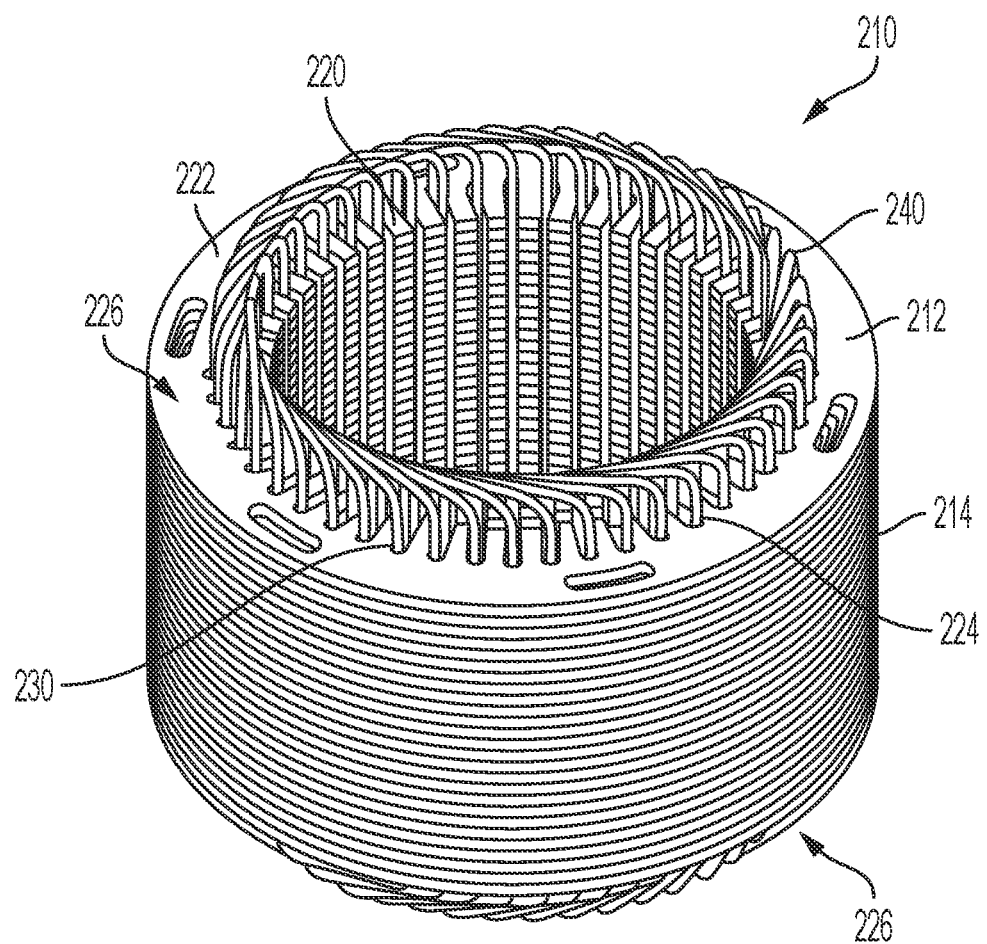
FIG. 2 is a perspective view of an electric machine stator illustrating stacked laminations with an epoxy overmold winding guide feature.
Figure 3:
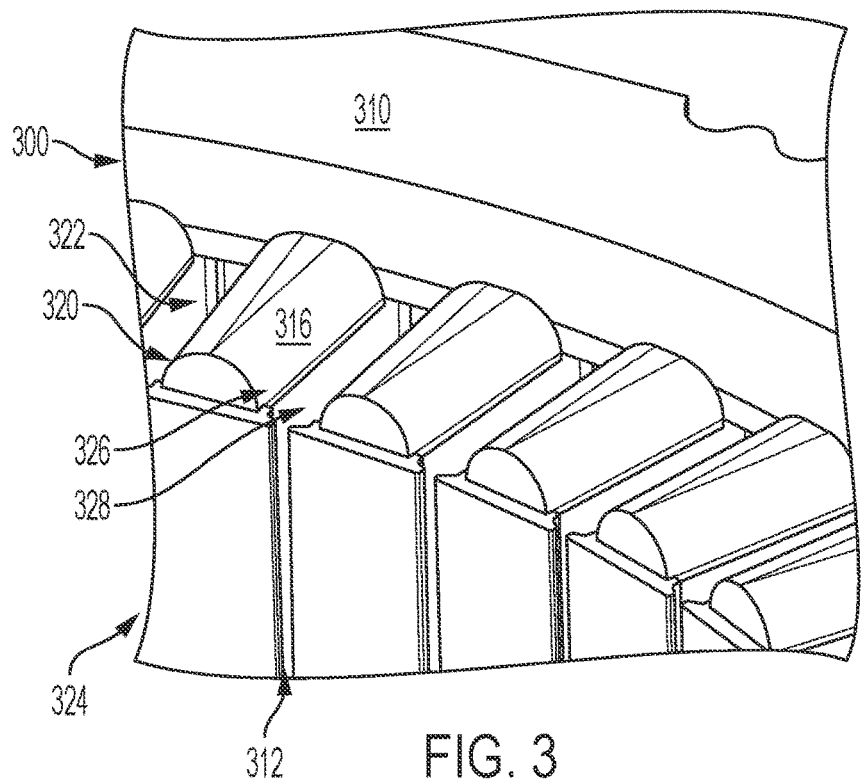
FIG. 3 illustrates an embodiment of a molded epoxy winding guide embedded with a stator core.
Figure 4:
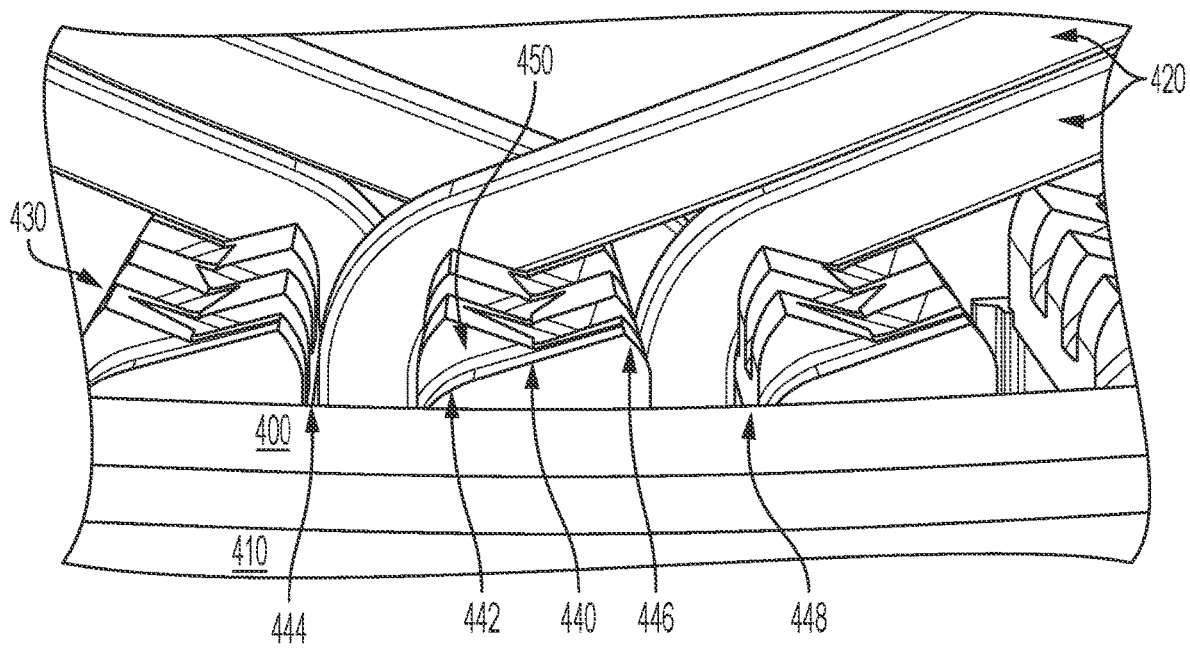
FIG. 4 illustrates another embodiment of a molded epoxy winding guide.

FIG. 2 is a perspective view of a representative stator formed by stacked laminations each having stator slots with molded epoxy winding guide features according to various embodiments of the present disclosure (best shown in FIGS. 3-4). Electric machine 114 (FIG. 1) includes a stator 210 having a plurality of laminations 212. When stacked, the laminations 212 form a stator core 214. Each of the laminations 212 may have an annular or donut shape to accommodate a rotor (not shown) separated by an air gap and surrounded by the stator core 214. The rotor may be mechanically connected to a shaft using a complementary key and slot configuration.

Each lamination 212 includes a plurality of teeth 220 integrally formed of unitary construction and extending radially inward from a back iron or yoke portion 222 toward the inner diameter. Adjacent teeth 220 cooperate to define slots 224. The teeth 220 of each lamination 212 are aligned such that stator slots 224 extend through the stator core 214 between the opposing end faces 226. The end faces 226 define the opposing ends of the core 214 and are formed by the first and last laminations 212. A molded epoxy electrically insulating slot liner (FIGS. 3-4) is formed in the slots 224. A plurality of windings 230 are wrapped around various groups of teeth 220 and are disposed within the stator slots 224. Each slot 224 includes several passes or turns of the conductors or wires that form the windings 230. The number of conductor passes or turns within each slot may vary depending on the particular application and implementation. In one embodiment, each slot 230 includes eight conductor turns or passes.

The conductors or wires forming windings 230 may have various cross-sectional geometries, such as circular or rectangular (including square) depending on the particular application and implementation. The windings 230 may be disposed or potted in an insulating material or compound (not shown) such as a varnish, lacquer, epoxy, or resin, for example, that is applied as a liquid or fluid during assembly and at least partially fills gaps between windings in the slots prior to curing or hardening to form a rigid structure. Portions of the windings 230 generally extend in an axial direction along the stator slots 224. At the end faces 226 of the stator core 214, the windings 230 bend as guided by the end face of the embedded epoxy winding guide to extend in a circumferential direction around the end faces 226 forming the hairpins or end windings 240.

FIG. 3 illustrates an embodiment of a molded epoxy winding guide 300 embedded with a stator core 310. The molded epoxy winding guide 300 is formed using an overmold positioned within the stator core and filled with liquid epoxy that cures and hardens as a thermoset polymer to form the winding guide features illustrated. The cured epoxy provides electrical insulation and thermal conductivity for the windings positioned within, and extending from the slots formed between adjacent teeth of the stator. The slots may include a small opening toward the inner circumference 312, or may be closed or sealed slots depending on the particular design of the stator. In the embodiment of FIG. 3, the winding guide feature 316 of winding guide 300 includes a first arcuate surface 320 extending from a first slot 322 over at least a portion of an end face of an associated tooth 324 and joining to a second arcuate surface 326 extending from a second slot 328. In one embodiment, the epoxy extends within each slot 322, 328 to replace/eliminate electrically insulating slot liner paper. The arcuate surfaces 320, 326 are configured to provide a bending radius to associated windings exiting the slots to form hairpin end windings. After forming of the molded epoxy winding guide, the windings are positioned within the slots with at least one end of the windings bent or formed against a corresponding arcuate surface of the associated slot. Each slot 322, 328 may include a single winding, or a plurality of windings as generally illustrated in the embodiment of FIG. 4, depending on the number of phases and particular design of the electrical machine.

FIG. 4 illustrates another embodiment of a molded epoxy winding guide 400 formed on a stator 410 with representative rectangular windings 420. Winding guide 400 includes a plurality of protuberances 430 molded over at least a portion of a corresponding tooth of stator 410. Each protuberance 430 includes a ramped portion 440 extending from a lower first arcuate or curved surface portion 442 associated with a first slot 444 to a higher second curved surface portion 446 associated with a second slot 448. In the embodiment of FIG. 4, each tooth includes a second protuberance 450 having a second ramped surface extending from a higher third curved surface associated with the first slot 444 to a lower fourth curved surface associated with the second slot 448. The number of protuberances 430 associated with each tooth corresponds to the number of windings 420 of each slot. Protuberances 430 provide a bending guide (arcuate surface portion 442) in addition to radially spacing of windings 420 exiting a common slot 444.

As illustrated in FIGS. 2-4, a method of manufacturing an electric machine includes forming a stator core from a plurality of laminations each having teeth extending from a yoke portion toward an inner circumference, adjacent teeth forming a slot therebetween. The method includes molding a winding guide on the stator core using a fluid that hardens to form electrically insulating arcuate surfaces extending from the slots over the teeth of at least one end face of the stator core. The method further includes positioning windings within and extending from the slots and bending the windings against the arcuate surfaces to form end windings. Positioning the windings may include positioning a plurality of windings in each of the slots. Molding the winding guide may include molding a plurality of protuberances on the at least one end face, each of the protuberances having a ramped surface extending from an arcuate surface extending from a first one of the slots to an arcuate surface extending from a second one of the slots adjacent to the first one of the slots. The method may include molding a plurality of ramped protuberances for each of the slots, each slot having an associated first protuberance ramping from a lower arcuate surface associated with a first slot to a higher arcuate surface associated with a second slot adjacent to the first slot, and a second protuberance ramping from a higher arcuate surface associated with the first slot to a lower arcuate surface associated with the second slot. The number of ramped protuberances may correspond to the number of windings for each slot, with at least a portion of the protuberances extending between windings extending from the same slot. The molded winding guide may be formed by a fluid epoxy after curing or hardening. The method may also include coating the stator, windings, and winding guide with an electrically insulating fluid that is cured or hardened to increase mechanical rigidity of the assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery; and
an electric machine powered by the traction battery and configured to provide propulsive power to the vehicle, the electric machine including a rotor separated by an air gap from a stator surrounding the rotor, the stator including teeth extending from a yoke portion toward the rotor and defining slots between adjacent teeth, the slots coated with an electrically insulating material having an arcuate surface exiting the slots and extending at least partially onto and over the teeth on at least one end face of the stator, the stator further including windings positioned within and extending from the slots in contact with the arcuate surface of the electrically insulating material;
wherein each slot includes a plurality of windings and wherein the electrically insulating material comprises protuberances extending between the plurality of windings over the teeth on the end face of the stator; and
wherein the electrically insulating material forms a ramped surface extending from a lower first curved surface associated with a first slot to a higher second curved surface associated with a second slot, the second slot being adjacent to the first slot.

2. The vehicle of claim 1 wherein the electrically insulating material comprises an epoxy.

3. The vehicle of claim 2 wherein the epoxy is hardened or cured before the windings are positioned within the slots.

4. The vehicle of claim 3 wherein the windings comprise electrically conductive windings having a rectangular cross section.

5. An electric machine comprising:
a rotor; and
a stator surrounding the rotor and separated by an air gap, the stator comprising teeth extending from a yoke portion toward the rotor and defining slots between adjacent teeth, the stator including a molded electrically insulating material coating the slots and having a curved surface extending from the slots and at least partially covering the teeth on at least one end face configured to guide associated windings extending from the slots,
wherein each slot has a plurality of associated windings and wherein the electrically insulating material extends between at least a portion of the windings for each slot, and
wherein the electrically insulating material forms a ramped surface extending from a lower first curved surface associated with a first slot to a higher second curved surface associated with a second slot, the second slot being adjacent to the first slot.

6. The electric machine of claim 5 wherein the electrically insulating material forms a second ramped surface extending from a higher third curved surface associated with the first slot to a lower fourth curved surface associated with the second slot.

7. The electric machine of claim 5 wherein the molded electrically insulating material comprises an epoxy.

8. The electric machine of claim 7 wherein the epoxy is hardened before the windings are positioned within the slots.

9. The electric machine of claim 5 wherein the windings comprise electrical conductors having a rectangular cross-sectional area.

10. A vehicle comprising an electric machine according to claim 5, the electric machine powered by a traction battery and configured to provide propulsive power to the vehicle.

11. A method of manufacturing an electric machine comprising:
forming a stator core from a plurality of laminations each having teeth extending from a yoke portion toward an inner circumference, adjacent teeth forming a slot therebetween;
molding a winding guide on the stator core using an electrically insulating fluid that hardens to form arcuate surfaces extending from the slots to the teeth of at least one end face of the stator core; and
positioning windings within and extending from the slots, and bending the windings against the arcuate surfaces to form end windings;
wherein molding the winding guide comprises molding a plurality of ramped protuberances for each of the slots, each slot having an associated first protuberance ramping from a lower arcuate surface associated with a first slot to a higher arcuate surface associated with a second slot adjacent to the first slot, and a second protuberance ramping from a higher arcuate surface associated with the first slot to a lower arcuate surface associated with the second slot.

12. The method of claim 11 wherein positioning the windings comprises positioning a plurality of windings in each of the slots.

13. The method of claim 11 wherein molding the winding guide comprises molding a plurality of protuberances on the at least one end face, each of the protuberances having a ramped surface extending from an arcuate surface extending from a first one of the slots to an arcuate surface extending from a second one of the slots adjacent to the first one of the slots.

14. The method of claim 11 wherein positioning the windings comprises positioning a plurality of windings in each of the slots, and wherein the plurality of windings corresponds in number to the plurality of ramped protuberances.

15. The method of claim 11 wherein the winding guide comprises an epoxy.

16. A vehicle comprising an electric machine manufactured according to claim 11, the electric machine powered by a traction battery and configured to provide propulsive power to the vehicle.

* * * * *